(12) United States Patent
December et al.

(10) Patent No.: US 9,365,738 B2
(45) Date of Patent: Jun. 14, 2016

(54) HIGH SOLIDS COATING AND PROCESS FOR COATING

(71) Applicant: BASF Coatings GmbH, Münster (DE)

(72) Inventors: Timothy S. December, Rochester Hills, MI (US); John G. Partyka, Brighton, MI (US); Donald H. Campbell, Hartland, MI (US)

(73) Assignee: BASF Coatings GmbH, Munster (DE)

( * ) Notice: Subject to any disclaimer, the term of this patent is extended or adjusted under 35 U.S.C. 154(b) by 0 days.

(21) Appl. No.: 14/363,853

(22) PCT Filed: Nov. 16, 2012

(86) PCT No.: PCT/US2012/065578
§ 371 (c)(1),
(2) Date: Jun. 9, 2014

(87) PCT Pub. No.: WO2013/085697
PCT Pub. Date: Jun. 13, 2013

(65) Prior Publication Data
US 2014/0357766 A1    Dec. 4, 2014

Related U.S. Application Data

(60) Provisional application No. 61/568,919, filed on Dec. 9, 2011.

(51) Int. Cl.
| | |
|---|---|
| *C09D 133/12* | (2006.01) |
| *C09D 133/08* | (2006.01) |
| *C09D 167/00* | (2006.01) |
| *B05D 3/00* | (2006.01) |
| *C08L 75/02* | (2006.01) |
| *C09D 175/02* | (2006.01) |
| *C08L 61/28* | (2006.01) |

(52) U.S. Cl.
CPC ............. *C09D 133/12* (2013.01); *B05D 3/007* (2013.01); *C09D 133/08* (2013.01); *C09D 167/00* (2013.01); *C08L 61/28* (2013.01); *C08L 75/02* (2013.01); *C09D 175/02* (2013.01)

(58) Field of Classification Search
None
See application file for complete search history.

(56) References Cited

U.S. PATENT DOCUMENTS

| | | |
|---|---|---|
| 2,979,514 A | 4/1961 | O'Brien et al. |
| 3,082,180 A | 3/1963 | Boldizar et al. |
| 3,479,328 A | 11/1969 | Nordstrom |
| 3,674,838 A | 7/1972 | Nordstrom |
| 4,105,708 A | 8/1978 | Parekh |
| 4,126,747 A | 11/1978 | Cowherd, III et al. |
| 4,279,833 A | 7/1981 | Culbertson et al. |
| 4,293,692 A | 10/1981 | Pai et al. |
| 4,301,257 A | 11/1981 | Zengel et al. |
| 4,311,622 A | 1/1982 | Buter |
| 4,340,497 A | 7/1982 | Knopf |
| 4,440,937 A * | 4/1984 | Krimm ............... C07D 319/06 528/370 |
| 4,546,046 A | 10/1985 | Etzell et al. |
| 4,584,354 A | 4/1986 | Hudecek et al. |
| 4,677,028 A * | 6/1987 | Heeringa et al. ........... 428/422.8 |
| 4,758,632 A | 7/1988 | Parekh et al. |
| 4,888,373 A | 12/1989 | Abrams |
| 5,098,952 A * | 3/1992 | Blasko et al. ................. 525/123 |
| 5,356,669 A | 10/1994 | Rehfuss et al. |
| 6,437,056 B1 | 8/2002 | Dahm et al. |
| 7,741,510 B2 | 6/2010 | Lenges et al. |
| 7,799,858 B2 * | 9/2010 | Brinkhuis et al. ............ 524/445 |
| 2004/0131786 A1 * | 7/2004 | Ma et al. .................... 427/385.5 |
| 2004/0158022 A1 | 8/2004 | Baumgart et al. |
| 2006/0155021 A1 * | 7/2006 | Lenges .................... C08K 5/21 524/211 |
| 2006/0159870 A1 | 7/2006 | Lenges et al. |
| 2012/0041143 A1 * | 2/2012 | Zhou .................. C08G 64/0208 524/612 |

FOREIGN PATENT DOCUMENTS

| | | |
|---|---|---|
| DE | 19810220 | 9/1999 |
| EP | 0192304 | 8/1986 |
| EP | 0198519 | 10/1986 |
| WO | WO-94/10211 | 5/1994 |

OTHER PUBLICATIONS

Handbook of Polymer Coatings for Electronics, Second Ed., James Licari and Laura Hughes, 1990, p. 96.*
PCT International Search Report and Written Opinion in PCT/US2012/065578, mailed Apr. 9, 2013, 6 pages.
PCT International Preliminary Report on Patentability in PCT/US2012/065578, mailed Jun. 19, 2014, 8 pages.

* cited by examiner

*Primary Examiner* — Satya Sastri
(74) *Attorney, Agent, or Firm* — Servilla Whitney LLC

(57) ABSTRACT

Described is a high solids coating composition having exceptional rheological properties and appearances comprising (a) a thermosetting binder, (b) from about 0.1 to about 10 wt. % based on binder solids of solid polyurea particles prepared by the reaction of a mixture of a polyisocyanate and an amino reactant comprising a primary or secondary monoamine that optionally has a hydroxyl or ether group or both, and (c) from about 2 to about 25 wt. % on resin solids of an acrylic polymer having a number average molecular weight of from about 2000 to about 8000 and a glass transition temperature of from about 50 to about 120° C.

18 Claims, No Drawings

HIGH SOLIDS COATING AND PROCESS FOR COATING

CROSS-REFERENCE TO RELATED APPLICATIONS

This application is the National State entry of PCT/US2012/065578, filed on Nov. 16, 2012, which claims priority to U.S. Provisional Application Ser. No. 61/568,919, filed on Dec. 9, 2011, the disclosures of which are incorporated herein by reference in their entireties.

TECHNICAL FIELD

The present disclosure relates to coating compositions and coating methods, more particularly to automotive and industrial high solids, thermosetting coating compositions that provide good appearance and methods for applying these coating compositions and controlling the rheology of the applied coating compositions to provide good appearance.

BACKGROUND

The statements in this section merely provide background information related to the present disclosure and may not constitute prior art.

"High solids" is a designation given in the industrial and automotive coatings fields to coating compositions or paints that are solventborne compositions and have a higher nonvolatile content, such as a nonvolatile content of more than about 40 weight percent (wt. %). The nonvolatile content is determined in accordance with ASTM Test Method D2369, in which the test sample is heated at 110° C. (230° F.) for 60 minutes. Coatings manufacturers have worked to reduce solvent content of industrial and automotive coating compositions for decades and have over the years developed various higher solids technologies. The solids content that can be achieved for a particular coating composition depends to a certain extent on the type of coating it is and the properties it must have on the substrate. It is generally understood that, while very low molecular weight resins allow less solvent to be added, one may not be able to achieve the necessary application and cured coating properties using such low molecular weight resins. As another example, one is generally able to make a sprayable clearcoat coating composition with a higher solids content than a sprayable pigmented coating composition. The dispersed pigment tends to increase viscosity of the coating so that more solvent must be added to obtain a suitable spray viscosity (that is, a suitable viscosity for application by spraying the coating onto the substrate).

The color and appearance of the coating can be of primary importance, as is true, for example, for automotive topcoat coatings. The color for these topcoats are provided by monocoat topcoat coatings, which are a single-layer topcoat, or basecoat coatings, which are used as the color layer under a clearcoat coating layer in a composite two-layer topcoat. Special effect colors, e.g. metallic and pearlescent colors and coatings with color-variable pigments, present an added challenge for these topcoat coatings. special effect flake pigments. Special effect pigments are those that can produce a gonioapparent effect in a coating layer. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments including colored aluminum flake pigment, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance or color when viewed at different angles. Rheology control is needed during application of these coating compositions to allow the flakes to orient parallel to the face of the film for optimum gonioapparent effect. The flake pigments that produce metallic and pearlescent colors and colors that vary with viewing angle must, during drying of the applied coating layer, achieve an orientation substantially parallel to the substrate to provide the optimum desired metallic, pearlescent, or color-variable effect. High solids coating compositions with these pigments, grouped generally as "metallic" coating compositions, have not provided the outstanding difference in brightness between face (viewed head-on) and flop (viewed at an oblique angle) that can be achieved for low solids, high-solvent-content coatings. Obtaining proper rheology control during application and cure of pigmented high solids topcoats, especially when using high solids metallic topcoat compositions, while continuing to meet the stringent performance requirements for such coatings remains a demanding task.

Unpigmented clearcoat topcoat coatings require some kind of rheology control agent to allow a extremely high degree of surface smoothness to achieve a high distinctness of image (DOI). Clearcoat and monocoat topcoat coating layers are generally relatively thick, typically between 1.5 and 3 mils (about 38 to about 76 microns) thick for both appearance and protection. In coating automotive vehicle bodies, the topcoat is applied to both horizontal and vertical surfaces. Manufacturing economy constraints require this relatively thick clearcoat or monocoat topcoat layer be applied in a minimum of time and manufacturing floor space; accordingly, the clearcoat or monocoat coating composition is applied thickly onto the substrate, leaving in the coating layer a significant amount of solvent that must be evaporated before bake, during a "flash" period of solvent evaporation, and during bake of the topcoat. While there is less of a problem on horizontal surfaces with applying a rather thick coating layer leaving significant solvent content in the layer, on vertical surfaces a topcoat layer with still significant solvent content may flow too much, causing sags to develop in the coating layer. Sagging may also occur in other areas where the substrate is not flat horizontally, for example along character lines, gutters, or channels of an automotive vehicle body. Thus, rheology control is important for this reason as well.

SUMMARY

We have discoveredDescribed are metallic and other high solids coating compositions having exceptional rheological properties and methods for obtaining better rheology control in metallic and other high solids coating compositions and for preparing and applying such high solids coating compositions to produce metallic or other coatings with exceptional appearance.

Further described is a high solids coating composition containing (a) a thermosetting binder, (b) from about 0.1 to about 10 wt. % based on binder solids of solid polyurea particles prepared by the reaction of a polyisocyanate and an amino reactant comprising a monoamine, and (c) from about 2 to about 25 wt. % on binder solids of an acrylic polymer having a number average molecular weight of from about 2000 to about 8000 and a glass transition temperature of from about 50 to about 120° C. The solid polyurea particles prepared by the reaction of a polyisocyanate and an amino reactant comprising a monoamine will be referred to as "solid polyurea particles." The acrylic polymer having these features will be referred to as "low molecular weight, high Tg acrylic polymer."

In various embodiments, the high solids coating compositions are topcoat compositions. In various embodiments, the high solids coating composition further comprises a pigment, particularly basecoat and monocoat topcoat compositions. Among the embodiments further comprising a pigment are high solids coating compositions comprising a flake pigment, particularly basecoat and monocoat topcoat compositions.

In another aspect, a method is disclosed of spray applying the high solids coating composition containing a thermosetting binder, solid urea particles, and the low molecular weight, high Tg acrylic polymer in a layer on a substrate, then curing the applied coating composition to produce a cured coating on the substrate.

Also described is a method of coating a substrate that includes applying at least one primer coating composition to form a primer layer, at least one basecoat composition to form a basecoat layer, and at least one clearcoat composition to form a clearcoat layer to a substrate; where the basecoat composition is applied when the primer layer is uncured; wherein the basecoat composition is the high solids coating composition comprising a thermosetting binder, solid urea particles, and the low molecular weight, high Tg acrylic polymer. In various embodiments, the basecoat composition comprises a flake pigment or a combination of flake pigments.

Further described is a method of coating a substrate that includes applying at least one primer coating composition to form a primer layer, at least one basecoat composition to form a basecoat layer, and at least one clearcoat composition to form a clearcoat layer to a substrate; wherein the clearcoat composition is applied when the basecoat layer is uncured; and wherein the basecoat composition is the high solids coating composition comprising a thermosetting binder, solid urea particles, and the low molecular weight, high Tg acrylic polymer. In various embodiments, the basecoat composition comprises a flake pigment or a combination of flake pigments.

Yet further described is a method of coating a substrate that includes applying at least one primer coating composition to form a primer layer, at least one basecoat composition to form a basecoat layer, and at least one clearcoat composition to form a clearcoat layer to a substrate; where the basecoat composition is applied when the primer layer is uncured and the clearcoat composition is applied when the basecoat layer is uncured; and wherein the basecoat composition is the high solids coating composition comprising a thermosetting binder, solid urea particles, and the low molecular weight, high Tg acrylic polymer. In various embodiments, the basecoat composition comprises a flake pigment or a combination of flake pigments.

Additionally described is a method for obtaining better rheology control in metallic and other high solids coating compositions in which an effective amount of a rheology control additive package including solid polyurea particles and a low molecular weight, high Tg acrylic polymer is included in the high solids coating compositions.

In a method of preparing a high solids coating composition, a binder resin including solid polyurea particles is combined with a low molecular weight, high Tg acrylic polymer. The binder is thermosetting. In various embodiments, a flake pigment or a combination of flake pigments is included in the high solids coating composition. The high solids coating composition is applied in a topcoat layer on a substrate (as a monocoat topcoat layer or as a basecoat layer of a basecoat-clearcoat composite topcoat) and cured to provide a coating with exceptional appearance on the substrate. A high solids coating composition including a flake pigment is applied in a layer on a substrate and cured to provide an effect coating with exceptional effect appearance on the substrate, where the effect is a metallic effect when a metallic pigment is used, a pearlescent effect when a pearlescent pigment is used, and a color-variable effect when a color-variable pigment is used.

In various embodiment, the high solids coating composition includes a rheology control agent in addition to the solid polyurea particles and the low molecular weight, high Tg acrylic polymer. In various embodiments, the high solids coating composition includes a further rheology control agent selected from cellulose mixed esters other than the low molecular weight cellulose mixed ester, microgel rheology control agents such as crosslinked acrylic polymer microparticles, wax rheology control agents, inorganic phyllosilicates, and fumed silicas. In various embodiments, the high solids coating composition further includes from about 0.1 to about 3% by weight based on binder weight of an additional rheology control agent selected from cellulose mixed esters, crosslinked acrylic polymeric microparticles, inorganic phyllosilicates, and fumed silicas.

The disclosed compositions and methods provide coatings with enhanced appearance and particularly enhanced special effect appearance for coatings including flake pigments. The disclosed compositions have superior rheological properties during application of the coating compositions that is provided by the combination of the two rheology control agents, the solid polyurea particles and the low molecular weight, high Tg acrylic polymer. This combination of rheology control agents provides unexpected synergy, resulting in excellent color consistency and metallic appearance in high solids basecoats and topcoats, while allowing the coating composition's solids content to remain high. In light of the prior art it was surprising and unforeseeable that the disclosed coating compositions and methods of the invention could provide improved rheology control and metallic appearance of colored, high solids topcoats without any decrease in stability, durability, nonvolatile content, and other performance requirements. The synergistic improvement in color consistency and metallic appearance could not have been predicted based upon performance of the two rheology control agents individually or in view of earlier known rheology control agent combinations.

In describing these coating compositions and methods, certain terms are used that have the following meanings.

For convenience, "resin" is used in this disclosure to encompass resin, oligomer, and polymer. "Binder" refers to the film-forming components of the coating composition. Thus, resins, crosslinkers, and other film-formers are part of the binder, but solvents, pigments, additives like antioxidants, HALS, UV absorbers, leveling agents, and the like are not part of the binder. A "thermosetting" binder refers to curable or crosslinkable binders.

Number average molecular weight and weight average molecular weight are determined by gel permeation chromatography of a sample dissolved in tetrahydrofuran using polystyrene or poly(methyl methacrylate) standards. "Polydispersity" is the ratio of weight average molecular weight over number average molecular weight.

Glass transition temperature is measured by Differential Scanning calorimetry or calculated using the Fox Equation, in which the reciprocal of the glass transition temperature (in degrees Kelvin) of the copolymer is the summation for all different copolymerized monomers of the reciprocal of the glass transition temperature (in degrees Kelvin) for a homopolymer of each monomer multiplied by the weight fraction of that monomer in the copolymer. (See T. G. Fox, Bull. Am. Phys. Soc. 1 (1956) 123.) The glass transition temperatures of homopolymers for the purposes are reported in literature, particularly in the "Polymer Handbook", edited by J. Brandrup et al., Wiley-Interscience, (currently in a fourth edition republished in 2003) or, if unavailable in literature, the Tg of a homopolymer may be measured by differential scanning colorimetry (DSC).

"Pigment" refers to colorants that are insoluble in the coating composition. "Flake pigment" refers to pigments that are in the form of flakes or thin platelets, such as mica-based pigments and metal flake pigments like aluminum pigment.

"Metal travel" and "travel" both refer to a difference in brightness of a coating when viewed head-on ("face") and when viewed at an oblique angle ("flop"). Travel can be measured in different ways. One way is metal flop index, MFI, which is determined with a spectrophotometer according to the following formula:

$$MFI = 50 \times (L25 - L75)/L75,$$

where L25 and L75 are the measurement of lightness L taken at angles of 25° and 75°, respectively, from the plane of the coating layer. A higher metal flop index number indicates more travel.

"A," "an," "the," "at least one," and "one or more" are used interchangeably to indicate that at least one of the item is present; a plurality of such items may be present. Other than in the working examples provides at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses. The details, examples and preferences provided above in relation to any particular one or more of the stated aspects of the present invention, and described and exemplified below in relation to any particular one or more of the stated aspects of the present invention, apply equally to all aspects of the present invention.

The high solids coating composition includes the thermosetting binder, the solid polyurea particles, and the low molecular weight, high Tg acrylic polymer. The solid polyurea particles are insoluble in the binder and are the reaction product of a reaction product comprising a polyisocyanate and a monoamine.

The solid polyurea particles may be those described, for example, in US Patent Publication No. US 2004/0158022, U.S. Pat. Nos. 4,311,622 and 4,888,373 European Patent Publications No. EP 0 198 519 and EP 0 192 304. The monoamine may be a primary or secondary amine and may include hydroxyl or ether groups. The coating composition may include 0.1 to 10 percent by weight of the solid polyurea particles, based on total binder weight. The solid polyurea particles may have an average particle size of from 0.01 to 50 micrometers.

In general the solid polyurea particles may be prepared by reacting a mixture including a polyisocyanate compound or combination of polyisocyanate compounds and a monoamine or combination of monoamines, and that may include other, optional reactants. The monoamine may be a primary or secondary monoamine, which may include hydroxyl or ether groups. The reaction mixture may further include water, a polyamine, a monoisocyanate, or a combination of these optional further reactants. In various embodiments, a polyamine with primary and/or secondary amine groups or a combination of such polyamines and/or water is included along with the monoamine or combination of monoamines as described in the reaction mixture with the polyisocyanate or combination of polyisocyanates. In various embodiments, the solid polyurea particles may be prepared by reacting a mixture including a polyisocyanate compound, a monoisocyanate compound, a monoamine, and a polyamine.

The polyisocyanate or polyisocyanates may be selected from any organic compound having at least two isocyanate groups per molecule, including not only those in which the isocyanate groups are attached to a hydrocarbon radical but also those in which the isocyanate groups are attached to a radical including a heteroatom such as oxygen or nitrogen, for example as part of ester groups, ether groups, tertiary amine groups, urea groups, urethane groups, biurets, isocyanurates, allophanate groups, uretdione groups, and the like, as well as combinations of these. Any suitable diisocyanate may be used for the preparation of the solid polyurea particles such as an aliphatic or aralphatic or cycloaliphatic or aromatic diisocyanate. The diisocyanate usually contains from 3 to 40, and in various embodiments the diisocyanate may contain from 4 to 20, from 5 to 24, or from 6 to 18, carbon atoms. In certain specific embodiments, a symmetrical aliphatic or cycloaliphatic diisocyanate is used. Nonlimiting examples of suitable diisocyanates include trimethylene-1,3-diisocyanate, tetramethylene-1,4-diisocyanate, hexamethylene-1,6-diisocyanate, ω,ωα-dipropylether diisocyanate, cyclohexyl-1,4-diisocyanate, dicyclohexylmethane-4,4'-diisocyanate, 1,5-dimethyl-2,4-bis(isocyanatomethyl)benzene, 1,5-dimethyl-2,4-bis(isocyanatoethyl)benzene, 1,3,5-trimethyl-2,4-bis(isocyanatomethyl)benzene, 1,3,5-triethyl-2,4-bis(isocyanatomethyl)benzene, isophorone diisocyanate, dicyclohexyldimethylmethane-4,4'-diisocyanate, 2,4-toluene diisocyanate, 2,6-toluene diisocyanates, diphenylmethane-4,4'-diisocyanate, m-tetramethylxylene diisocyanate, naphthalene-1,5-diisocyanate, p-phenylene diisocyanate, methyl-2,6-diisocyanatohexanoate; isocyanurates, biurets, allophanates, and uretdiones of these; and combinations of any plurality of these. In various embodiments, it is advantageous to use an aliphatic or homocyclic diisocyanate containing 6-9 carbon atoms, such as cyclohexyl-1,4-diisocyanate, toluene diisocyanates and hexamethylene diisocyanate, isocyanurates of these compounds, and combinations of these.

Optionally, the mixture may include a monoisocyanate such as octyl isocyanate, cyclohexyl isocyanate, butyl isocyanate, hexyl isocyanate, decyl isocyanate, undecyl isocyanate, and combinations of these.

The second component of the reaction mixture used in the preparation of the solid polyurea particles is a monoamine, which may have a hydroxyl group or an ether group. In various embodiments, the monoamine may have not more than about 24 carbon atoms and more particularly not more than about 12 carbon atoms. Specific, nonlimiting examples of suitable monoamines without hydroxyl or ether groups that may be used include benzylamine, ethylamine, n-propylamine, isopropylamine, n-butylamine, isobutylamine, tert-butylamine, n-pentylamine, 1-methylbutylamine, 2-methylbutylamine, 1-ethylpropylamine, N-ethylbutylamine, N-methylbutylamine, n-hexylamine, n-octylamine, iso-nonanylamine, iso-tridecylamine, n-decylamine, stearylamine, and combinations of these. In various embodiments, monoamines having 1-4 aliphatic carbon atoms such as benzylamine, propylamine, and tert-butylamine are used. Specific, nonlimiting examples of suitable monoamines having hydroxyl groups that may be used include 2-aminoethanol, 1-aminoethanol, 2-aminopropanol, 3-aminopropanol, 1-amino-2-propanol, 2-amino-2-methyl propanol, 2-aminobutanol, 5-aminopentanol, 3-amino-2,2-dimethyl-1-propanol, 2-(2-aminoethoxy)ethanol, 2-amino-1-butanol, 2-amino-2-methyl-1-propanol, and polyhydroxymonoamines such as 2-amino-2-methyl-1,3-propanediol, 2-amino-2-ethyl-1,3-propanediol, diethanolamine, and combinations of these. The monoamine may also have an ether linkage. Specific, nonlimiting examples of such alkoxyamines include 2-methoxyethylamine, 2-ethoxyethylamine, 3-methoxy-1-propylamine, 1-methoxymethylpropylamine, 1,1-dimethoxy-2 propylamine, 3-ethoxy-1-propylamine, 3-butoxy-1-propylamine, 3-(2-ethylhexyloxy)-1-propylamine, 3-tridecyloxypropylamine, 3-stearyloxypropylamine, p-methoxybenzylamine, 3,4-dimethoxybenzylamine, p-methoxyphenylethylamine, 3,4-dimethoxyphenyl-ethylamine, 9-phenoxy-4,7-dioxanon-1-amine, 2-methyl-4-methoxyaniline, 2,5-dimethoxy-aniline, furfurylamine, tetrahydrofurfurylamine, 2-(4-morpholinyl)ethylamine, 4-(3-aminopropyl)morpholine, 2,2'-aminoethoxyethanol, and combinations of these. Mixtures of one or more monoamines, with and without hydroxyl or ether groups, may be used in any combination. In certain embodiments, the monoamine is or includes a primary monoamine such as an aliphatic monoamine with 1 to about 6 carbon atoms. In certain embodiments, the monoamine may be selected from benzylamine, ethylamine, n-propylamine, isopropylamine, n-butylamine, isobutylamine, tert-butylamine, 2-aminoethanol, 1-aminoethanol, 2-aminopropanol, 3-aminopropanol, 1-amino-2-propanol, 2-amino-2-methyl propanol, 2-methoxyethylamine, 2-ethoxyethylamine, 3-methoxy-1-propylamine, 1-methoxymethylpropylamine, and combinations of these.

In further embodiments, a polyamine may be included in the reaction mixture forming the solid polyurea particles. The polyamine in certain embodiments is a diamine in which the amine groups may be primary amine groups. Nonlimiting examples of suitable polyamines include aliphatic, cycloaliphatic, aromatic, aliphatic-aromatic, cycloaliphatic-aromatic, and aliphatic-cycloaliphatic polyamines, in which the nomenclature is used in a way that "aliphatic-aromatic polyamine" indicates a polyamine in which at least one amino group is attached to an aliphatic group and at least one amino group is attached to an aromatic group and the nomenclature is applied accordingly for the other types of polyamines mentioned.

Further examples of other solid polyurea particles that may be used include those disclosed in Baumgart et al., U.S. Patent Application Publication No. 2004/0158022 and in Lenges et al., U.S. Pat. No. 7,741,510, the relevant contents of both being incorporated herein by reference.

In certain embodiments, the reaction mixture is or includes a monoamine selected from benzylamine, propylamine, and tert-butylamine, 2-methoxyethylamine, 2-ethoxyethylamine, 3-methoxy-1-propylamine, 1-methoxymethylpropylamine, 2-aminoethanol, 1-aminoethanol, 2-aminopropanol, 3-aminopropanol, 1-amino-2-propanol, 2-amino-2-methyl propanol, 2-aminobutanol, p-methoxybenzylamine, 3,4-dimethoxybenzylamine, and combinations of these and a polyisocyanate selected from cyclohexyl-1,4-diisocyanate, toluene diisocyanates and hexamethylene diisocyanate, isocyanurates of these compounds, and combinations of these compounds.

In the reaction between the diisocyanate and the monoamine, generally either the diisocyanate or the monoamine may be used in excess relative to the stoichiometric amount. For example, the ratio of the equivalents of amino groups of the monoamine and any optional polyamine and water to the equivalents of isocyanate groups of the polyisocyanate and any optional monoisocyanate may be from about 0.7 to about 1.5 equivalents amine for each equivalent isocyanate, or from about 0.9 to about 1.2 equivalents amine for each equivalent isocyanate, or from about 0.95 to about 1.1 equivalents amine for each equivalent isocyanate, or approaching 1:1 even more closely. In various embodiments, a monoamine or a combination of monoamines may be reacted with a polyisocyanate or a combination of polyisocyanates, with the reactants being apportioned so that the ratio of equivalents between amino groups and isocyanate groups from about 1.2 to about 0.4. In various embodiments the ratio of equivalents between amino groups and isocyanate groups from about 1.0 to about 0.8. Aliphatic monoamines and polyisocyanates may be preferred when the solid polyurea particles are used in certain coating compositions.

When a polyamine is included, the reactants may be apportioned so that the ratio of equivalents between amino groups to isocyanate groups from about 1:2 to about 2:1, which may in various embodiments be about 1:1.8 to about 1.8:1, 1:1.6 to about 1.6:1, 1:1.4 to about 1.4:1, or 1:1.2 to about 1.2:1. In the reaction forming the solid polyurea particles, the ratio of equivalents of amine groups from a polyamine (when included) to amine groups from a monoamine may be from about 4:1 to about 1:2; in various particular embodiments, the ratio of equivalents of amine groups from a polyamine to amine groups from a monoamine may be from about 3:1 to about 1:1, from about 2:1 to about 1:1, from about 1.5:1 to about 1:1, or from about 1.2:1 to about 1:1.

The reaction between the diisocyanate and the monoamine may generally be carried out in any way by combining the reaction components, optionally at elevated temperature. For example, the reaction may be carried out in an inert atmosphere at a temperature in the range of from about 10° to 150° C., or in the range of 20° to 80° C. Generally, the diisocyanate should be added to the monoamine, which may be done in several steps, if desired.

The reaction may optionally be carried out in the presence of an inert organic solvent, such as for example, acetone, methyl isobutyl ketone, benzene, toluene, xylene, or an aliphatic hydrocarbon such as petroleum ether, or may optionally be carried out in the presence of a binder resin. The binder may be any that is suitable for topcoat or basecoat coating compositions. Nonlimiting, suitable examples that may be mentioned include polyesters, polyurethanes, including those prepared using polyester diols or polyether diols as monomers, acrylic resins and other polyvinyl resins, epoxy resins, alkyds, unsaturated oligomers and resins, aminoplasts, polyepoxides, and polycarboxylic acid or anhydride oligomers and polymers. In various embodiments, the solid polyurea particles are formed in a polyester, polyurethane, or acrylic resin or combination of such resins. When carried out in the presence of an organic solvent, the procedure may be for the amine component to be added to one or a mixture of more than one organic solvent and then to add the polyisocyanate component as quickly as possible and with very vigorous stirring. When carried out in the presence of a binder resin, a mixture of the binder resin and the polyisocyanate may be mixed with a mixture of the binder resin and the monoamine. The mixing operation may be carried out in any convenient manner, with the reactants being vigorously stirred. In an embodiment of this method the binder is mixed with such amounts of the polyisocyanate and the monoamine that upon conclusion of the reaction there is obtained a mixture to be used as master batch of the solid polyurea particles having from about 1 to about 20% by weight of the solid polyurea particles and from about 80 to about 99% by weight of the binder resin or from about 1 to about 10% by weight of the solid polyurea particles and from about 90 to about 99% by weight of the binder, based on the combined weights of binder and solid polyurea particles. These weight ratios may result in obtaining a mixture which can very readily be homogeneously mixed with the binder to be employed in the preparation of the coating composition. The binders in the coating composition and in the master batch of the solid polyurea particles may be of the same or of different composition. In one or more embodiments, in this "in situ" preparation the reaction is carried out in an atmosphere of inert gas at a temperature in the range of 20° to 80° C., in which case first the monoamine is added to the binder and, after the mixture has been homogenized, the polyisocyanate is slowly added to the mixture, with stirring.

In certain embodiments, if the solid polyurea particles are not prepared in situ in the binder, the two components of the thixotropic coating composition can be mixed by melting the solid polyurea particles at a temperature in the range of 80° to 200° C. in the presence of the binder, as a result of which a homogeneous mixture is obtained. After the mixture has been cooled to room temperature, the solid polyurea particles form a dispersion in the binder.

In various embodiments, the coating composition includes up to about 10% or about 0.1% to about 5% or about 0.2% to about 5% by weight of the solid polyurea particles based on the total binder weight. The solid polyurea particles may be added in a composition having from about 15 wt. % to about 50 wt. % or from about 20 wt. % to about 40 wt. % of the combined weights of a binder resin and solid polyurea particles prepared in the binder resin.

The solid polyurea particles in the coating compositions generally have an average particle size of from about 0.01 to about 50 micrometers, or in certain embodiments from about 0.1 to about 20 micrometers or about 3 to about 17 micrometers. The average particle size may be determined in various ways, for example using a Coulter counter, laser diffraction (also known as laser light scattering), or, even, in a more general sense, using a Hegman fineness-of-grind gauge.

The disclosed high solids coating composition also includes the low molecular weight, high Tg acrylic polymer. The high solids coating composition includes from about 2 to about 25 wt. % on total binder weight of a low molecular weight, high Tg acrylic polymer. In various embodiments, the high solids coating composition includes from about 5 to about 20 wt. % or from about 5 to about 13 wt. % or from about 6 to about 10 wt. % on total binder weight of a low molecular weight, high Tg acrylic polymer.

The low molecular weight, high Tg acrylic polymer has a number average molecular weight of from about 2000 to about 8000. In various embodiments, the low molecular weight, high Tg acrylic polymer may have a number average molecular weight of from about 4000 to about 8000, and various coating compositions may use a low molecular weight, high Tg acrylic polymer having a number average molecular weight of from about 5500 to about 7500. In various embodiments the low molecular weight, high Tg acrylic polymer may have a weight average molecular weight of from about 5000 to about 25,000, particularly from about 10,000 to about 22,000 and a polydispersity of from about 2.0 to about 4, particularly from about 2.5 to about 3.5.

The low molecular weight, high Tg acrylic polymer has a glass transition temperature of from about 50 to about 120° C. in various embodiments, the low molecular weight, high Tg acrylic polymer has a glass transition temperature of from about 60 to about 110° C., from about 65 to about 100° C., or from about 70 to about 90° C. The Tg may be is measured by Differential Scanning calorimetry or calculated using the Fox Equation, in which the reciprocal of the glass transition temperature (in degrees Kelvin) of the copolymer is the summation for all different copolymerized monomers of the reciprocal of the glass transition temperature (in degrees Kelvin) for a homopolymer of each monomer multiplied by the weight fraction of that monomer in the copolymer. Although there may be small variations between the glass transition temperatures determined by these two methods for the low molecular weight, high Tg acrylic polymer, such small variations are no significant for the use of the low molecular weight, high Tg acrylic polymer in the high solids coatings as disclosed and in the methods as disclosed.

The low molecular weight, high Tg acrylic polymer may have functional groups reactive with another component of the high solids coating composition during curing of the coating. In one or more embodiments, the acrylic polymer low molecular weight, high Tg acrylic polymer has active hydrogen functionality. Nonlimiting examples of such active hydrogen functionality include hydroxyl and carbamate groups and combinations of these. The term "carbamate" refers to a group having a structure

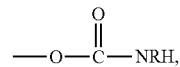

in which R is H or alkyl. In one or more embodiments, R is H or alkyl of from 1 to about 4 carbon atoms, and more specifically R is H. Further examples of reactive functional groups are those described below as examples of polymer functional groups for the thermosettable resins curable with a crosslinking agent.

Suitable hydroxyl-functional, low molecular weight, high Tg acrylic resins may be prepared by polymerizing one or more hydroxyl-functional, ethylenically unsaturated monomers with one or more other ethylenically unsaturated monomers. Suitable examples of hydroxy-functional ethylenically unsaturated monomers include hydroxy alkyl esters of acrylic or methacrylic acid. (In the context of this description, the term "(meth)acrylate" will be used to indicate that both the methacrylate and acrylate esters are included.) Nonlimiting examples of hydroxyl-functional monomers include hydroxyethyl(meth)acrylate, hydroxypropyl(meth)acrylates, hydroxybutyl(meth)acrylates, hydroxyhexyl(meth)acrylates, other hydroxyalkyl(meth)acrylates having branched or linear alkyl groups of up to about 10 carbons, and mixtures of these.

Generally, at least about 5% by weight hydroxyl-functional monomer is included in the polymer. Example embodiments include up to about 15% by weight hydroxyl-functional monomer in the polymer. In certain embodiments, a hydroxyl-functional, low molecular weight, high Tg acrylic polymer polymerized from hydroxyethyl(meth)acrylate, hydroxypropyl(meth)acrylates, and mixtures of these may be used. The person skilled in the art will appreciate that hydroxyl groups can be generated by other means, such as, for example, the ring opening of a glycidyl group, for example from glycidyl methacrylate, by an organic acid or an amine. Hydroxyl functionality may also be introduced through thioalcohol compounds, including, without limitation, 3-mercapto-1-propanol, 3-mercapto-2-butanol, 11-mercapto-1-undecanol, 1-mercapto-2-propanol, 2-mercaptoethanol, 6-mercapto-1-hexanol, 2-mercaptobenzyl alcohol, 3-mercapto-1,2-proanediol, 4-mercapto-1-butanol, and combinations of these. Any of these methods may be used to prepare a useful hydroxyl-functional acrylic polymer.

Suitable carbamate-functional, low molecular weight, high Tg acrylic resins may be prepared by polymerizing one or more ethylenically unsaturated monomers having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesizing such a monomer involves reaction of a hydroxy ester with urea to form the carbamyloxy carboxylate (i.e., carbamate-modified acrylic monomer). Another method of synthesis reacts an $\alpha,\beta$-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers by techniques well known in the art.

An alternative route for preparing the carbamate-functional, low molecular weight, high Tg acrylic resins is to react an already-formed acrylic polymer with another component to form a carbamate-functional group appended to the polymer backbone, as described in U.S. Pat. No. 4,758,632. One technique for preparing such polymers involves thermally decomposing urea (to give off ammonia and HNCO) in the presence of a hydroxy-functional acrylic polymer to form a carbamate-functional polymer. Another technique involves reacting the hydroxyl group of a hydroxyalkyl carbamate with the isocyanate group of an isocyanate-functional polymer to form the carbamate-functional polymer. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate. Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to "transcarbamylate" a hydroxy-functional polymer with an alkyl carbamate. A more difficult, but feasible way of preparing the polymer would be to trans-esterify with a hydroxyalkyl carbamate.

Examples of suitable comonomers that may be polymerized along with the ethylenically unsaturated monomer having the crosslinkable functionality or the functionality that will be derivatized to provide the crosslinkable functionality include, without limitation, $\alpha,\beta$-ethylenically unsaturated monocarboxylic acids containing 3 to 5 carbon atoms such as acrylic, methacrylic, and crotonic acids and the alkyl and cycloalkyl esters, nitriles, and amides of acrylic acid, methacrylic acid, and crotonic acid; $\alpha,\beta$-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic alcohols containing 1 to 20 carbon atoms, such as methyl, ethyl, propyl, isopropyl, n-butyl, isobutyl, tert-butyl, hexyl, 2-ethylhexyl, dodecyl, cyclohexyl, alkyl-substituted cyclohexyl, alkanol-substituted cyclohexyl, such as 2-tert-butyl and 4-tert-butyl cyclohexyl, 4-cyclohexyl-1-butyl, 2-tert-butyl cyclohexyl, 4-tert-butyl cyclohexyl, 3,3,5,5,-tetramethyl cyclohexyl, tetrahydrofurfuryl, isobornyl, lauryl, and stearyl acrylates, methacrylates, and crotonates; unsaturated dialkanoic acids and anhydrides such as fumaric, maleic, itaconic acids and anhydrides and their mono- and diesters with alcohols such as methanol, ethanol, propanol, isopropanol, butanol, isobutanol, and tert-butanol, like maleic anhydride, maleic acid dimethyl ester and maleic acid monohexyl ester; vinyl acetate, vinyl propionate, vinyl ethyl ether, and vinyl ethyl ketone; styrene, $\alpha$-methyl styrene, vinyl toluene, 2-vinyl pyrrolidone, and p-tert-butylstyrene. The co-monomers may be used in any desired combination to obtain that provides the required glass transition temperature and coating properties.

In various embodiments, the low molecular weight, high Tg acrylic resin acrylic polymer is polymerized using one or more cycloaliphatic monomers. Nonlimiting, suitable examples of cycloaliphatic monomers include cyclohexyl(meth)acrylate, (meth)acrylate esters of alkyl-substituted cyclohexanol, and (meth)acrylate esters of alkanol-substituted cyclohexane, such as 2-tert-butyl and 4-tert-butyl cyclohexyl(meth)acrylate, 4-cyclohexyl-1-butyl(meth)acrylate, and 3,3,5,5,-tetramethyl cyclohexyl(meth)acrylate; isobornyl(meth)acrylate; isomenthyl(meth)acrylate; cyclopentyl(meth)acrylate, (meth)acrylate esters of alkyl-substituted cyclopentanols, and (meth)acrylate esters of alkanol substituted cyclopentanes; adamantanyl(meth)acrylates; cyclododecyl(meth)acrylate; cycloundecanemethyl(meth)acrylate; dicyclohexylmethyl(meth)acrylate; cyclododecanemethyl (meth)acrylate; menthyl(meth)acrylate; and so on, as well as combinations of these. In some embodiments cyclohexyl(meth)acrylate, isobornyl(meth)acrylate or both are used. The cycloaliphatic monomer units are included in the acrylic polymer in amounts of at least about 45% by weight, specifically at least about 60% by weight, and more specifically at least about 65% by weight of the polymer. It is advantageous for the cycloaliphatic monomer units to be included in the low molecular weight, high Tg acrylic resins in amounts of up to about 85% by weight, particularly up to about 80% by weight, and especially up to about 75% by weight of the polymer.

The acrylic polymer may be prepared using conventional techniques, such as by heating the monomers in the presence of a polymerization initiating agent and optionally a chain transfer agent. In one or more embodiments, the polymerization is carried out in solution, although it is also possible to polymerize the acrylic polymer in bulk or as an emulsion.

Typical initiators are organic peroxides such as dialkyl peroxides such as di-t-butyl peroxide, peroxyesters such as t-butyl peroxy 2-ethylhexanoate, and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicylic acid, mercaptoacetic acid, mercaptoethanol and the other thiol alcohols already mentioned, and dimeric alpha-methyl styrene.

The reaction is usually carried out at temperatures from about 20° C. to about 200° C. The reaction may conveniently be done at the temperature at which the solvent or solvent mixture refluxes, although with proper control a temperature below the reflux may be maintained. In one or more embodiments, the initiator should be chosen to match the temperature at which the reaction is carried out, so that the half-life of the initiator at that temperature should be no more than about thirty minutes. Further details of addition polymerization generally and of polymerization of mixtures including (meth) acrylate monomers is readily available in the polymer art.

The rheological behavior of the high solids coating composition, and thus the appearance of coated substrates prepared using the high solids coating composition, depends on the content of solid polyurea particles and low molecular weight cellulose mixed esters and the nature of the solid polyurea particles, the low molecular weight cellulose mixed ester, and the binder. Generally, the solid polyurea particles may be used in an amount of 0.1 to 10 percent by weight, or in various embodiments from about 0.2 to about 9 percent by weight, or from about 0.3 to about 8 percent by weight, or from about 0.4 to about 7 percent by weight, or from about 0.5 to about 6 percent by weight, all being based on total binder weight. In any of these embodiments, high Tg acrylic polymer is include in an amount from about 2 to about 25 percent by weight, or from about 5 to about 20 percent by weight, or from about 5 to about 13 percent by weight, or from about 6 to about 10 percent by weight, based on total binder weight.

The binder may be any that is suitable for topcoat or basecoat coating compositions. The binder may be thermosettable, including those resins that are self-crosslinking, curable with a curing or crosslinking agent, or curable by exposure to actinic radiation such as UV or EB radiation, and crosslinking agents for such resins. The binder may include any one or combination of a wide variety of resins or polymers. Nonlimiting examples of suitable curable polymers include vinyl polymers such as acrylic polymers (poly(meth)acrylates) and modified acrylic polymers including those that are branched, grafted, and copolymers having polyester, polyether, or other blocks, polyesters, polyurethanes, polyurethanes prepared using macomonomers such as polyester diols, polyether diols, and polycarbonate diols; alkyds, epoxy resins, polycarbonates, polyamides, polyimides, polysiloxanes, alkyds, and unsaturated oligomers and resins, and mixtures thereof, all of which are known in the art. In various embodiments, the curable polymer has groups reactive with a crosslinker. Nonlimiting examples of polymer functional groups include carboxyl, hydroxyl, aminoplast functional groups, urea, carbamate, isocyanate, (blocked or unblocked), epoxy, cyclic carbonate, amine, aldehyde groups, thiol groups, hydrazide groups, activated methylene groups, and any combinations thereof that may be made in a thermosettable polymer. In various embodiments the polymer functional groups are hydroxyl, primary carbamate, isocyanate, aminoplast functional groups, epoxy, carboxyl and mixtures thereof. In certain embodiments the polymer functional groups are hydroxyl, primary carbamate, and mixtures thereof.

In one embodiment of the invention, the polymer is an acrylic polymer. In one or more embodiments, the acrylic polymer has a number average molecular weight of 500 to 20,000 and more specifically of 1500 to 10,000. The number average molecular weight is determined by gel permeation chromatography of a sample dissolved in tetrahydrofuran using polystyrene or poly(methyl methacrylate) standards. Such polymers are well-known in the art, and can be prepared from monomers such as methyl acrylate, methyl methacrylate, acrylic acid, methacrylic acid, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, cyclohexyl acrylate and cyclohexyl methacrylate and vinylaromatic hydrocarbons, such as vinyltoluene, alpha-methylstyrene and styrene, as well as amides or nitriles of acrylic or methacrylic acid, vinyl esters and vinyl ethers. Any crosslinkable functional group, e.g., hydroxyl, amine, glycidyl, carbamate, and so on can be incorporated into the ester portion of the acrylic monomer. Nonlimiting examples of hydroxy-functional acrylic monomers that can be used to form such polymers include hydroxyethyl acrylate, hydroxybutyl acrylate, hydroxybutyl methacrylate, hydroxypropyl acrylate. Amino-functional acrylic monomers would include t-butylaminoethyl methacrylate and t-butylamino-ethylacrylate. Glycidyl groups may be incorporated by copolymerizing glycidyl methacrylate or allyl glycidyl ether, for example. Other acrylic monomers having crosslinkable functional groups in the ester portion of the monomer are also within the skill of the art.

Modified acrylics can also be used as the film-forming curable polymer in the coating compositions. Such acrylics may be polyester-modified acrylics or polyurethane-modified acrylics, as is well known in the art. Polyester-modified acrylics modified with e-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Polyesters can also be used as a binder resin in the coating composition. Polyester resins may be formulated as acid-functional or hydroxyl-functional resins. The polyester may have an acid number of from about 20 to about 100, or from about 20 to about 80, or from about 20 to about 40 mg KOH per gram. In another embodiment, the polyester may have a hydroxyl number of from about 25 to about 300, or from about 25 to about 150, or from about 40 to about 100 mg KOH per gram. The methods of making polyester resins are well-known. Typically, a polyol component and an acid and/or anhydride component or polymerizable derivative such as a methyl ester are heated together, optionally with a catalyst, and usually with removal of the by-product water or methanol in order to drive the reaction to completion. The polyol component has an average functionality of at least about two. The polyol component may contain mono-functional, di-functional, tri-functional, and higher functional alcohols. In one or more embodiments, diols are used, but when some branching of the polyester is desired, higher functionality alcohols are included. Illustrative examples include, without limitation, alkylene glycols and polyalkylene glycols such as ethylene glycol, propylene glycol, diethylene glycol, triethylene glycol, propylene glycol, dipropylene glycol, neopentyl glycol, 1,4-butanediol, 1,3-butanediol, 2,3-butanediol, 1,3-propanediol, 1,5-pentanediol, 1,6-hexanediol, 1,9-nonanediol, 1,4-cyclohexane dimethanol, 2,2,4-trimethyl-1,3-pentanediol, 2-methyl-2-ethyl-1,3-propanediol, 2-ethyl-1,3-hexanediol, hydrogenated bisphenol A, and hydroxyalkylated bisphenols. Optionally, a small amount of tri-functional, and higher functional alcohols may be used, such as glycerine, trimethylolpropane, trimethylolethane, or pentaerythritol. The acid and/or anhydride component comprises compounds having on average at least two carboxylic acid groups and/or anhydrides or low alkyl (C1-C4, particularly methyl) esters of these. In one or more embodiments, dicarboxylic acids or anhydrides of dicarboxylic acids are used, but higher functional acid and anhydrides can be used when some branching of the polyester is desired. Suitable polycarboxylic acid or anhydride compounds include, without limitation, those having from about 3 to about 20 carbon atoms. Illustrative examples of suitable compounds include, without limitation, phthalic acid, isophthalic acid, terephthalic acid, hexahydrophthalic acid, tetrahydrophthalic acid, pyromellitic acid, malonic acid, maleic acid, succinic acid, azeleic acid, glutaric acid adipic acid, azelaic acid, 1,4-cyclohexanedicarboxylic acid, dodecane-1,12-dicarboxylic acid, citric acid, trimellitic acid, and anhydrides thereof. Optionally, monocarboxylic acids such as octanoic acid, nonanoic acid, stearic acid, and cyclohexanoic acid; and hydroxycarboxylic acids such as dimethylolpropionic acid; as well as combinations of these compounds.

Polyurethanes having crosslinkable functional groups such as hydroxyl groups are also well known in the art. They are prepared by a chain extension reaction of a polyisocyanate (e.g., hexamethylene diisocyanate, isophorone diisocyanate, MDI, and any others of those mentioned above as useful in preparing the solid polyurea particles and combinations of these) and a polyol (e.g., 1,6-hexanediol, 1,4-butanediol, neopentyl glycol, and any others of those mentioned as useful in preparing a polyester and combinations of these), as well as macrodiols such as polyester diols, polyether diols, and polycarbonate diols. They can be provided with crosslinkable functional groups by capping the polyurethane chain with an excess of diol, polyamine, amino alcohol, or the like.

Carbamate functional polymers and oligomers can also be used as curable polymer, especially those having at least one primary carbamate group.

Carbamate functional examples of the curable polymer used in the coating compositions can be prepared in a variety of ways. For example, and using the case of an acrylic polymer, one way to prepare such polymers is to prepare a monomer, e.g., an acrylic monomer, having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing the curable polymer of the binder is to react an already-formed polymer such as an acrylic polymer, polyester polymer, or polyurethane polymer with another component to form a carbamate-functional group appended to the polymer backbone, as described in U.S. Pat. No. 4,758,632. One technique for preparing such polymers involves thermally decomposing urea (to give off ammonia and HNCO) in the presence of a hydroxy-functional acrylic polymer to form a carbamate-functional polymer. Another technique involves reacting the hydroxyl group of a hydroxyalkyl carbamate with the isocyanate group of an isocyanate-functional polymer to form the carbamate-functional polymer. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Isocyanate-functional polyurethanes may be formed by using an equivalent excess of diisocyanate or by end-capping a hydroxyl-functional prepolymer with a polyisocyanate. Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional polymer with an alkyl carbamate. A more difficult, but feasible way of preparing the polymer would be to trans-esterify with a hydroxyalkyl carbamate.

The binder of the coating compositions may further comprise a crosslinker. Crosslinkers may be used in amounts of from 10 to 60%, generally from 15 to 55%, or from 25 to 50%, all based on the total binder of the coating composition.

In certain specific embodiments, the reaction between the crosslinker and polymer to form irreversible linkages. Examples of functional group "pairs" producing thermally irreversible linkages are hydroxy/isocyanate (blocked or unblocked), hydroxy/epoxy, carbamate/aminoplast, carbamate/aldehyde, acid/epoxy, amine/cyclic carbonate, amine/isocyanate (blocked or unblocked), urea/aminoplast, and the like. Nonlimiting examples of crosslinker binder resins include aminoplasts, blocked or unblocked polyisocyanates, polyepoxides, polycarboxylic acid or anhydride compounds, oligomers, or polymers, and polyurea compounds or oligomers.

The high solids coating composition in certain embodiments includes an aminoplast as a crosslinker. An aminoplast for purposes of the invention is a material obtained by reaction of an activated nitrogen with a lower molecular weight aldehyde, optionally further reacted with an alcohol (in specific embodiments, a mono-alcohol with one to four carbon atoms) to form an ether group. In one or more embodiments, examples of activated nitrogens are activated amines such as melamine, benzoguanamine, cyclohexylcarboguanamine, and acetoguanamine; ureas, including urea itself, thiourea, ethyleneurea, dihydroxyethyleneurea, and guanylurea; glycoluril; amides, such as dicyandiamide; and carbamate functional compounds having at least one primary carbamate group or at least two secondary carbamate groups.

The activated nitrogen is reacted with a lower molecular weight aldehyde. In one or more embodiments, the aldehyde may be selected from formaldehyde, acetaldehyde, crotonaldehyde, benzaldehyde, or other aldehydes used in making aminoplast resins, although formaldehyde and acetaldehyde, especially formaldehyde. The activated nitrogen groups are at least partially alkylolated with the aldehyde, and may be fully alkylolated; specifically the activated nitrogen groups are fully alkylolated. The reaction may be catalyzed by an acid, e.g. as taught in U.S. Pat. No. 3,082,180, the contents of which are incorporated herein by reference.

The alkylol groups formed by the reaction of the activated nitrogen with aldehyde may be partially or fully etherified with one or more monofunctional alcohols. Suitable examples of the monofunctional alcohols include, without limitation, methanol, ethanol, propanol, isopropanol, butanol, isobutanol, tert-butyl alcohol, benzyl alcohol, and so on. In one or more embodiments, monofunctional alcohols having one to four carbon atoms and mixtures of these are used. The etherification may be carried out, for example, by the processes disclosed in U.S. Pat. Nos. 4,105,708 and 4,293,692, the disclosures of which are incorporated herein by reference.

The aminoplast may be at least partially etherified, and in various embodiments the aminoplast is fully etherified. For example, the aminoplast compounds may have a plurality of methylol and/or etherified methylol, butylol, or alkylol groups, which may be present in any combination and along with unsubstituted nitrogen hydrogens. One nonlimiting example of a fully etherified melamine-formaldehyde resin is hexamethoxymethyl melamine. Aminoplast crosslinkers may be used as crosslinkers for carbamate, terminal urea, and hydroxyl containing polymers.

The high solids curable coating composition in certain embodiments includes a polyisocyanate or blocked polyisocyanate crosslinker. Useful polyisocyanate crosslinkers include, without limitation, isocyanurates, biurets, allophanates, uretdione compounds, and isocyanate-functional prepolymers such as the reaction product of one mole of a triol with three moles of a diisocyanate. The polyisocyanate may be blocked with lower alcohols, oximes, or other such materials that volatilize at curing temperature to regenerate the isocyanate groups.

An isocyanate or blocked isocyanate is may be used in a 0.1-1.1 equivalent ratio, or in an equivalent ratio of 0.5-1.0 to each equivalent of functional groups reactive with it available from the crosslinkable binder resin.

Epoxide-functional crosslinkers may be used with carboxyl- or amine-functional crosslinkable resins. Illustrative examples of epoxide-functional crosslinkers are all known epoxide-functional polymers and oligomers. Nonlimiting examples of epoxide-functional crosslinking agents are polyglycidyl ethers, polyglycidyl esters, glycidyl methacrylate polymers, and isocyanurate-containing, epoxide-functional materials such as trisglycidyl isocyanurate and the reaction product of glycidol with an isocyanate-functional isocyanurate such as the trimer of isophorone diisocyanate (IPDI).

The high solids coating composition may include a catalyst to enhance the rate of the cure reaction. For example, especially when monomeric melamines are used as a curing agent, a strong acid catalyst may be utilized to enhance the cure reaction. Such catalysts are well-known in the art and include, without limitation, p-toluene sulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. For the reaction of polyisocyanates with suitable curable binder resin functionalities, suitable catalysts include tin compounds such as dibutyl tin dilaurate, dibutyl tin diacetate, dibutyl tin oxide, tertiary amines, zinc salts, and manganese salts. Reactions between epoxide and carboxyl groups may be catalyzed with tertiary amines or quaternary ammonium salts (e.g., benzyldimethylamine, dimethylaminocyclohexane, triethylamine, N-methylimidazole, tetramethyl ammonium bromide, and tetrabutyl ammonium hydroxide), tin and/or phosphorous complex salts (e.g., (CH3)3 SNI, (CH3)4 PI, triphenylphosphine, ethyltriphenyl phosphonium iodide, tetrabutyl phosphonium iodide) and so on.

The high solids coating compositions include one or more organic solvents. Nonlimiting examples of suitable solvents include aromatic hydrocarbons, ketones, esters, glycol ethers, and esters of glycol ethers. Specific examples include, without limitation, methyl ethyl ketone, methyl isobutyl ketone, m-amyl acetate, ethylene glycol butyl ether and ethylene glycol monobutyl ether acetate, propylene glycol monomethyl ether and propylene glycol monomethyl ether acetate, xylene, ethanol, propanol, isopropanol, n-butanol, isobutanol, tert-butanol, N-methyl pyrrolidone, N-ethyl pyrrolidone, Aromatic 100, Aromatic 150, naphtha, mineral spirits, butyl glycol, and so on.

The high solids coating composition may optionally include further rheology control agents, including high molecular weight mixed cellulose esters, such as CAB-381-0.1, CAB-381-20. CAB-531-1, CAB-551-0.01, and CAB-171-15S (available from Eastman Chemical Company, Kingsport, Tenn.), which may be included in amounts of up to about 5 wt. %, or from about 0.1 to about 5 wt. %, or from about 1.5 to about 4.5 wt. %, based on total binder weight. Further examples include microgel rheology control agents such as crosslinked acrylic polymeric microparticles, which may be included in amounts of up to about 5 wt. % of total binder weight; wax rheology control agents such as polyethylene waxes including acrylic acid-modified polyethylene wax (e.g., Honeywell A-C® Performance Additives), poly (ethylene-vinyl acetate) copolymers, and oxidized polyethylenes, which may be included in amounts of up to about 2 wt. % on total binder weight; and fumed silicas, which may be included in amounts of up to about 10 wt. % on total binder weight or from about 3 to about 12 wt. % on total binder weight.

Additional agents, for example hindered amine light stabilizers, ultraviolet light absorbers, anti-oxidants, surfactants, stabilizers, wetting agents, adhesion promoters, etc. may be incorporated into the coating composition. Such additives are well-known and may be included in amounts typically used for coating compositions.

Nonlimiting examples of special effect pigments that may be utilized in basecoat and monocoat topcoat coating compositions include metallic, pearlescent, and color-variable effect flake pigments. Metallic (including pearlescent, and color-variable) topcoat colors are produced using one or more special flake pigments. Metallic colors are generally defined as colors having gonioapparent effects. For example, the American Society of Testing Methods (ASTM) document F284 defines metallic as "pertaining to the appearance of a gonioapparent material containing metal flake." Metallic basecoat colors may be produced using metallic flake pigments like aluminum flake pigments, coated aluminum flake pigments, copper flake pigments, zinc flake pigments, stainless steel flake pigments, and bronze flake pigments and/or using pearlescent flake pigments including treated micas like titanium dioxide-coated mica pigments and iron oxide-coated mica pigments to give the coatings a different appearance (degree of reflectance or color) when viewed at different angles. Metal flakes may be cornflake type, lenticular, or circulation-resistant; micas may be natural, synthetic, or aluminum-oxide type. Flake pigments do not agglomerate and are not ground under high shear because high shear would break or bend the flakes or their crystalline morphology, diminishing or destroying the gonioapparent effects. The flake pigments are satisfactorily dispersed in a binder component by stirring under low shear. The flake pigment or pigments may be included in the high solids coating composition in an amount of about 0.01 wt. % to about 0.3 wt. % or about 0.1 wt. % to about 0.2 wt. %, in each case based on total binder weight.

Nonlimiting examples of commercial flake pigments include PALIOCROME® pigments, available from BASF Corporation.

Nonlimiting examples of other suitable pigments and fillers that may be utilized in basecoat and monocoat topcoat coating compositions include inorganic pigments such as titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), and ultramarine, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and so on. In one or more embodiments, the pigment or pigments are dispersed in a resin or polymer or with a pigment dispersant, such as binder resins of the kind already described, according to known methods. In general, the pigment and dispersing resin, polymer, or dispersant are brought into contact under a shear high enough to break the pigment agglomerates down to the primary pigment particles and to wet the surface of the pigment particles with the dispersing resin, polymer, or dispersant. The breaking of the agglomerates and wetting of the primary pigment particles are important for pigment stability and color development. Pigments and fillers may be utilized in amounts typically of up to about 40% by weight, based on total weight of the coating composition.

The combination of rheology control agents is particularly when used in a monocoat topcoat or basecoat coating composition containing a flake pigment. A monocoat topcoat coating composition is a pigmented coating composition applied as a final finishing coating layer that provides a desired color and gloss for the finish. Basecoat coating compositions are used with clearcoat coating compositions to provide a composite topcoat in which an underlying layer of basecoat provides a desired color and an overlying layer of clearcoat provides a desired gloss for the finish.

The particular solids for the high solids basecoats and monolayer topcoats varies with the color and color strength due to the effect of pigment loading and type of pigment on viscosity. Generally, the disclosed basecoats may have about 40 wt. % to about 55 wt. %, nonvolatile content, and typically may have about 45 wt. % to about 50 wt. % nonvolatile content, as determined by ASTM Test Method D2369, in which the test sample is heated at 110° C. (230° F.) for 60 minutes.

In general, a substrate may be coated by applying a primer layer, optionally curing the primer layer; then applying a basecoat layer and a clearcoat layer, typically wet-on-wet, and curing the applied layers and optionally curing the primer layer along with the basecoat and clearcoat layers if the primer layer is not already cured, or then applying a monocoat topcoat layer and curing the monocoat topcoat layer, again optionally curing the primer layer along with the basecoat and clearcoat layers if the primer layer is not already cured. The cure temperature and time may vary depending upon the particular binder components selected, but typical industrial and automotive thermoset compositions prepared as we have described may be cured at a temperature of from about 105° C. to about 175° C., and the length of cure is usually about 15 minutes to about 60 minutes.

The coating composition can be coated on a substrate by spray coating. Electrostatic spraying is a preferred method. The coating composition can be applied in one or more passes to provide a film thickness after cure of a desired thickness, typically from about 10 to about 40 microns for primer and basecoat layers and from about 20 to about 100 microns for clearcoat and monocoat topcoat layers.

The coating composition can be applied onto many different types of substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, primer surfacer, and/or basecoat, cured or uncured.

The substrate may be first primed with an electrodeposition (electrocoat) primer. The electrodeposition composition can be any electrodeposition composition used in automotive vehicle coating operations. Non-limiting examples of electrocoat compositions include the CATHOGUARD® electrocoating compositions sold by BASF Corporation, such as CATHOGUARD® 500. Electrodeposition coating baths usually comprise an aqueous dispersion or emulsion including a principal film-forming epoxy resin having ionic stabilization (e.g., salted amine groups) in water or a mixture of water and organic cosolvent. Emulsified with the principal film-forming resin is a crosslinking agent that can react with functional groups on the principal resin under appropriate conditions, such as with the application of heat, and so cure the coating. Suitable examples of crosslinking agents, include, without limitation, blocked polyisocyanates. The electrodeposition coating compositions usually include one or more pigments, catalysts, plasticizers, coalescing aids, antifoaming aids, flow control agents, wetting agents, surfactants, UV absorbers, HALS compounds, antioxidants, and other additives.

In one or more embodiments, the electrodeposition coating composition is applied to a dry film thickness of 10 to 35 µm. After application, the coated vehicle body is removed from the bath and rinsed with deionized water. The coating may be cured under appropriate conditions, for example by baking at from about 275° F. to about 375° F. (about 135° C. to about 190° C.) for between about 15 and about 60 minutes.

The invention is further described in the following examples. The example is merely illustrative and does not in any way limit the scope of the invention as described and claimed. All parts are parts by weight unless otherwise noted.

EXAMPLES

These methods were used in testing the examples that follow:

To assess metal control, the examples and comparative examples were compared visually and by measurement of lightness at particular angles. A panel made with a coating having effective metal control, or metallic appearance, has a bright (light) "flash" angle and dark "flop" angle. Visually, a painted panel is viewed in a way to see the direct reflection of incident light then titled very slightly; this is called the flash angle. The painted panel is then viewed at a much steeper angle, close to a right angle from the angle of direct reflection, were the coating should appear dark; this is called the flop angle. A measurement of lightness at an angle from the plane of the coating layer is determined with a multi-angle spectrophotometer or colorimeter (typically used for OEM automotive coatings). In the spectrophotometer, the illumination of the sample is 45° away from the line that is perpendicular to the surface of the panel. At an illumination angle of 45° the gloss (the surface reflection) occurs at the equal and opposite angle of reflection (also referred to as the specular angle), or −45°. The spectrophotometer has detectors placed at various locations described relative to the specular angle. In testing the examples these detectors are placed from 15° through 75° from the specular angle. Standard color tolerances for light metallic automotive topcoat colors were used. The measurements are recorded as a change in lightness from the lightness that is measured at that angle for a control panel prepared using the commercial product Shear Silver R99AW010F Basecoat, available from BASF Corporation, Metallic appearance is judged both visually and by comparing the differences in lightness measured at angles of 15° and 75°. When viewing the face of the coated panel straight on, the coating should be lightest and when viewed at increasingly oblique angles as the panel is moved away from the view to 90° angle from its original face-on position the coating should become darker and darker. Metallic appearance is judged by the brightness of the face (lighter is better) with increasing darkness to the furthest viewable angle from the face (darker is better), with a greater change in face lightness to flop darkness providing the greatest travel or metallic effect. Any increase in lightness with increasing angle of flop is undesirable and detracts from the visual metallic appearance, even if the coating becomes darker again at a still greater angle. Visually, as a panel is viewed more and more obliquely the coating should get darker and darker, not go through a As compared to the control panel, a <dL> measured at 15° greater than 0 indicates a lighter face and a <dL> measured at 75° less than 0 indicates a darker flop. A lighter value at 15° and a darker flop at 75° generally indicates better travel and better metallic appearance, unless the coating has the undesirable effect of increasing in lightness at an angle between 15° and 75°, which is undesirable. This latter effect can be determined by visually viewing the panel or by measuring lightness at intervening angles.

Nonvolatiles by weight, as determined by ASTM Test Method D2369, in which the test sample is heated at 110° C. (230° F.) for 60 minutes.

Example 1 and Comparative Examples A-C

Basecoat coating compositions were prepared using the ingredients shown in Table 1. The prepared coating compositions were reduced to a spray viscosity of 21 second as measured with a Fisher #2 cup and the nonvolatile content of each was determined by ASTM Test Method D2369, in which the test sample is heated at 110° C. (230° F.) for 60 minutes. These values are recorded in Table 2.

TABLE 1

| Component | Example 1, Weight | Comp. Example A, Weight | Comp. Example B, Weight | Comp. Example C, Weight |
|---|---|---|---|---|
| 20% by weight of CAB 381-0.5[1] in butyl acetate | 4.485 | 0.000 | 4.554 | 0.000 |
| High $T_g$ Acrylic[2] | 10.165 | 0.000 | 10.321 | 13.276 |
| butyl acetate | 5.214 | 5.405 | 5.183 | 5.459 |
| Aromatic 100 | 5.394 | 5.592 | 5.362 | 5.648 |
| Monomeric, fully-alkylated melamine-formaldehyde resin | 14.069 | 16.009 | 14.286 | 15.619 |
| Additive Package | 1.114 | 1.268 | 1.131 | 1.236 |
| Dispersion of 13% weight fumed silica in hydroxyl-functional acrylic polymer[3] | 8.117 | 9.237 | 8.242 | 9.011 |
| Dispersion with about 63% by weight of filler pigment and about 14% by weight hydroxyl-functional acrylic polymer[3] | 8.375 | 9.529 | 8.504 | 9.298 |
| Hydroxyl-functional acrylic polymer[3] | 0.000 | 9.070 | 9.327 | 10.197 |
| SETAL 82166 SS-64[4] | 10.764 | 12.248 | 0.000 | 0.000 |
| blocked acid catalyst | 1.810 | 2.054 | 1.838 | 2.010 |
| Dispersion of 31.5% by weight of aluminum (type 1) in hydroxyl-functional acrylic polymer[4] | 3.104 | 3.533 | 3.152 | 3.446 |
| Dispersion of 29.93% by weight of aluminum (type 2) in hydroxyl-functional acrylic polymer[4] | 13.068 | 14.870 | 13.269 | 14.508 |
| ethanol | 1.044 | 1.840 | 2.445 | 1.880 |
| Aromatic 100 | 13.276 | 9.345 | 12.387 | 8.412 |

[1]Obtained from Eastman Chemical Company (high molecular weight cellulose acetate butyrate polymer, butyryl content of 37 wt. %, acetyl content of 13 wt. %, hydroxyl content of 1.5 wt. %, $T_g$ 130° C., melting point 155-165° C., viscosity 1.9 poise as determined by ASTM Method D1343 in the solution described as Formula A).
[2]Polymerization product of 2.27 parts by weight 2-ethylhexyl acrylate, 5.68 parts by weight methyl methacrylate, 12.10 parts by weight hydroxymethyl methacrylate, 5.68 parts by weight styrene, 73.73 parts by weight cyclohexyl methacrylate, 50% nonvolatile in a mixture of methyl ethyl ketone and n-butyl acetate, having a theoretical $T_g$ of 70° C. as determined using the Fox equation and a Tg of 65.1 as measured by DSC, a hydroxyl number of 54 mg. KOH/gm nonvolatiles., and a number average molecular weight of 6650 daltons.
[3]75% nonvolatiles (NV) in Aromatic 100. The same hydroxyl-functional acrylic polymer is used in each case.
[4]SETAL 10-1821, obtained form Nuplex Resins LLC (slightly branched polyester polyol with 5.4% OH on nonvolatiles (NV), containing 2.5% by weight solid polyurea particles)

Preparation and Testing of Coated Panels Using Example 1 and Comparative Examples A, B, and C The silver basecoat compositions of Example 1 and Comparative Examples A, B, and C were individually applied onto 4-inch-by-twelve-inch primed steel panels, two for each of the example basecoats, by an automated, electrostatic application in two "coats" or application passes (one coat bell, one coat Sames air atomized), with a short pause or flash between coats. The wet basecoat was allowed to flash (four-minute flash at 170° F. (76.7° C.)), then a commercial clearcoat (UREGLOSS® R10CG060B, available from BASF Corporation) was applied over the basecoat on each panel in two coats with a short flash between coats and after the second and least coat. The basecoat coating layer and the clearcoat coating layer were then cured together in a forced air oven for 20 minutes at 265° F. (129.4° C.). One of the two panels prepared for each basecoat example was cured in a horizontal position in the oven and the second of the two panels was cured in an upright, near-vertical position in the oven.

Testing results for each panel prepared with one of the basecoat compositions of Example 1 and Comparative Examples A, B, and C are shown in the following table.

TABLE 2

| Basecoat Example | Nonvolatiles by weight | Orientation of panel during cure in oven | <dL> at 15° (target: >0) | <dL> at 75° (target: <0) |
|---|---|---|---|---|
| Control | 43.07 | Horizontal | 0 | 0 |
| Example 1 | 44.97 | Horizontal | 0.67 | −0.84 |
| Comparative Example A | 50.30 | Horizontal | −4.74 | 6.02 |
| Comparative Example B | 45.81 | Horizontal | −3.52 | 4.18 |
| Comparative Example C | 48.23 | Horizontal | −5.40 | 6.55 |
| Control | 43.07 | Vertical | 0 | 0 |
| Example 1 | 44.97 | Vertical | 1.36 | −1.52 |
| Comparative Example A | 50.30 | Vertical | −3.98 | 5.71 |
| Comparative Example B | 45.81 | Vertical | −4.91 | 6.07 |
| Comparative Example C | 48.23 | Vertical | 0.07 | −0.11 |

The results in Table 2 demonstrate that Example 1, the example of the inventor having a combination of solid polyurea particles and an acrylic polymer having a number average molecular weight of from about 2000 to about 8000 and a glass transition temperature of from about 50 to about 120° C., provides an improvement in metallic appearance relative to the control. This could not have been expected based on the much poorer results obtained from Comparative Examples A (without the high Tg acrylic) B (without the urea crystals), and C (without the urea crystals and without the CAB 381-0.5).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A high solids coating composition comprising
   (a) a thermosetting curable or crosslinking binder selected from the group consisting of polyesters; polyurethanes; polyurethanes prepared using macomonomers selected from polyester diols, polyether diols, and polycarbonate diols; alkyds; epoxy resins; polycarbonates; polyamides; polyimides; polysiloxanes; and unsaturated oligomers and resins; and mixtures thereof,
   (b) from about 0.1 to about 10 wt. % based on binder solids of solid polyurea particles prepared by reacting a reaction mixture of a polyisocyanate and an amino reactant comprising a primary or secondary monoamine that optionally has a hydroxyl or ether group or both, and
   (c) from about 2 to about 25 wt. % based on binder solids of an acrylic polymer having a number average molecular weight of from about 2000 to about 8000 and a glass transition temperature of from about 65 to about 120° C., wherein the acrylic polymer comprises cycloaliphatic monomer units.

2. The high solids coating composition according to claim 1, comprising a flake pigment.

3. The high solids coating composition according to claim 1, further comprising a rheology control agent selected from a cellulose mixed ester other than a low molecular weight cellulose mixed ester, crosslinked acrylic polymeric microparticles, an inorganic phyllosilicate, a fumed silica, or combinations thereof.

4. The high solids coating composition according to claim 1, wherein the reaction mixture further comprises water, a polyamine, a monoisocyanate, or a combination thereof.

5. The high solids coating composition according to claim 1, wherein the polyisocyanate comprises an aliphatic or homocyclic diisocyanate containing 6-9 carbon atoms or wherein the polyisocyanates is selected from the group consisting of cyclohexyl-1,4-diisocyanate, toluene diisocyanates, hexamethylene diisocyanate, isocyanurates of these, and combinations of these.

6. The high solids coating composition according to claim 1, wherein the amino reactant comprises a member selected from the group consisting of benzylamine, ethylamine, n-propylamine, isopropylamine, n-butylamine, isobutylamine, tert-butylamine, 2-aminoethanol, 1-aminoethanol, 2-aminopropanol, 3-aminopropanol, 1-amino-2-propanol, 2-amino-2-methyl propanol, 2-methoxyethylamine, 2-ethoxyethylamine, 3-methoxy-1-propylamine, 1-methoxymethylpropylamine, and combinations of these.

7. The high solids coating composition according to claim 1, wherein the solid polyurea particles are prepared by the reaction of the mixture in at least one of an acrylic, polyester, or polyurethane resin.

8. The high solids coating composition according to claim 1, wherein the acrylic polymer has a weight average molecular weight of from about 5000 to about 25,000 or a polydispersity of from about 2.0 to about 4, or both.

9. The high solids coating composition according to claim 1, wherein the acrylic polymer has active hydrogen functionality.

10. The high solids coating composition according to claim 1, wherein the cycloaliphatic monomer units are included in the acrylic polymer in amounts of from about 45% to about 85% by weight based on acrylic polymer weight.

11. The high solids coating composition according to claim 1, having at least about 40 wt. %, nonvolatile content.

12. A method of coating a substrate, comprising spray applying the high solids coating composition according to claim 1 in a layer on a substrate, then curing the applied coating composition to produce a cured coating on the substrate.

13. A method of coating a substrate, comprising applying at least one primer coating composition to form a primer layer, at least one basecoat composition to form a basecoat layer, and at least one clearcoat composition to form a clearcoat layer to a substrate; wherein the basecoat composition is applied when the primer layer is uncured; wherein the basecoat composition is the high solids coating composition according to claim 1.

14. A method of coating a substrate, comprising applying at least one primer coating composition to form a primer layer, at least one basecoat composition to form a basecoat layer, and at least one clearcoat composition to form a clearcoat layer to a substrate; wherein the clearcoat composition is applied when the basecoat layer is uncured; wherein the basecoat composition is the high solids coating composition according to claim 1.

15. A method of coating a substrate, comprising applying at least one primer coating composition to form a primer layer, at least one basecoat composition to form a basecoat layer, and at least one clearcoat composition to form a clearcoat layer to a substrate; where the basecoat composition is applied when the primer layer is uncured and the clearcoat composition is applied when the basecoat layer is uncured;

and wherein the basecoat composition is the high solids coating composition according to claim 1.

16. A method of coating a substrate, comprising applying the high solids coating composition according to claim 1 as a monocoat topcoat layer on a substrate.

17. A method of improving rheology control during a process of applying a high solids coating composition in a layer on a substrate and curing the applied layer, the method comprising including in the high solids coating composition from about 0.1 to about 10 wt. % based on binder solids of solid polyurea particles prepared by the reaction of a mixture of a polyisocyanate and an amino reactant comprising a primary or secondary monoamine that optionally has a hydroxyl or ether group or both, and from about from about 2 to about 25 wt. % based on binder solids of an acrylic polymer having a number average molecular weight of from about 2000 to about 8000 and a glass transition temperature of from about 65 to about 120° C., wherein the acrylic polymer comprises cycloaliphatic monomer units, wherein the high solids coating composition comprises a thermosetting curable or crosslinkable binder selected from the group consisting of polyesters; polyurethanes; polyurethanes prepared using macomonomers selected from polyester diols, polyether diols, and polycarbonate diols; alkyds; epoxy resins; polycarbonates; polyamides; polyimides; polysiloxanes; and unsaturated oligomers and resins; and mixtures thereof.

18. The method according to claim 17, wherein the high solids coating composition further comprises a member selected from the group consisting of an additional cellulose mixed ester other than a low molecular weight cellulose mixed ester, crosslinked acrylic polymeric microparticles, an inorganic phyllosilicate, a fumed silica, and combinations thereof.

* * * * *